April 20, 1926.

W. E. BROWN

WHEELED RIDING HARROW

Filed Nov. 3, 1925

1,581,167

Inventor

W. E. Brown

By Clarence A. O'Brien

Attorney

Patented Apr. 20, 1926.

1,581,167

UNITED STATES PATENT OFFICE.

WILLIAM E. BROWN, OF POTTSBORO, TEXAS.

WHEELED RIDING HARROW.

Application filed November 3, 1925. Serial No. 66,567.

*To all whom it may concern:*

Be it known that I, WILLIAM E. BROWN, a citizen of the United States, residing at Pottsboro, in the county of Grayson and State of Texas, have invented certain new and useful Improvements in Wheeled Riding Harrows, of which the following is a specification.

My present invention relates to harrows, and it contemplates a contribution to the harrow art by the provision of a wheeled riding harrow adapted to carry the driver close to the team where he will be out of the dust, and which is characterized by easy dumping means for getting rid of trash, and by spring means for balancing and causing the toothed or harrow members to float, this provision being particularly advantageous in the harrowing of young corn and cotton plants inasmuch as it averts damage to the young plants such as takes place when too heavy harrows are employed.

To the attainment of the foregoing, the invention consists in the improvement as hereinafter described and definitely claimed.

In the accompanying drawings, forming part of this specification:—

Similar numerals of reference designate corresponding parts in both views of the drawings.

Figure 1:
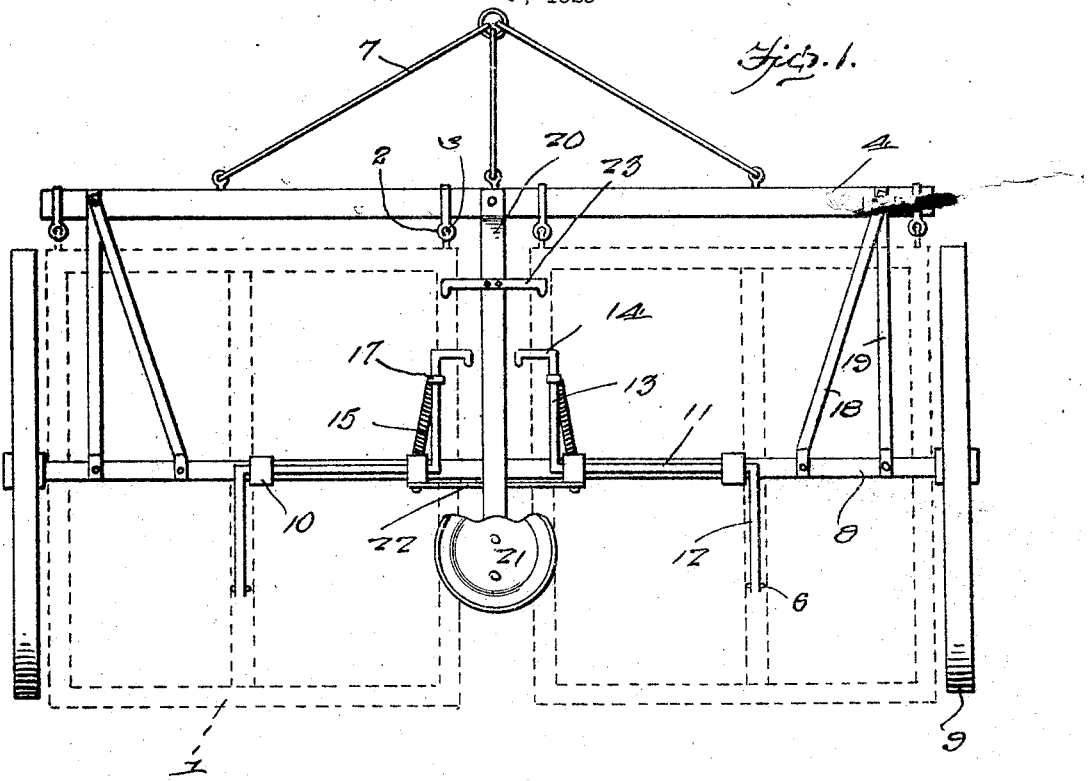
Figure 1 is a top plan view with my improvement which is preferably in the form of a riding attachment in full lines, and with the harrows in dotted lines.
Figure 2:
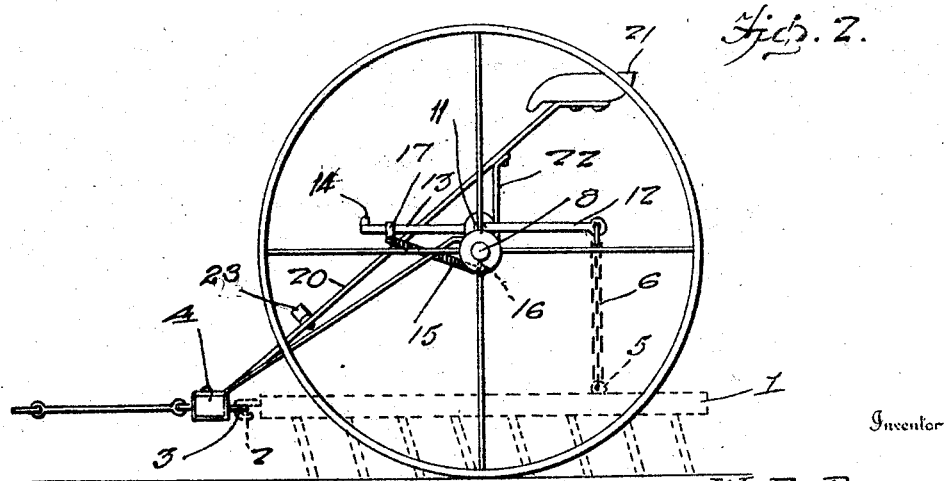
Figure 2 is a side elevation of the same.

The harrows 1 are used in side by side relation, and each toothed member or harrow per se may be of any construction consonant with the purposes of my invention, each harrow 1 having hooks 2 to engage in eyes 3 on a drawbar 4, and each harrow 1 being appropriately fitted at 5 for the attachment of a suspension chain 6. Aside from these points of connection, each harrow 1 is free to move, and hence it will be appreciated that each harrow 1 is capable of floating and of being adequately balanced as is desirable in the harrowing of young plants.

The drawbar 4 of my improvement is equipped at 7 with appropriate means for the attachment of draft animals or for the attachment of a tractor, and the axle 8 of the attachment is arranged in rear of and in a horizontal plane above that of the drawbar 4. The said axle 8 carries ground wheels 9, and is provided at 10 with rock shafts 11, one to each harrow 1. Each rock shaft 11 is provided with a rearwardly directed arm 12 for connection to the upper end of a suspension chain 6, and each rock shaft is also provided with a forwardly reaching arm 13, the terminal portion of which is shaped to form a pedal 14. The rock shafts 11 are operable independently of each other and hence when desired the driver may raise either of the harrows 1 without changing the position of the other harrow 1. Retractile springs 15 are associated with the arms 13 of the rock shaft 11 with a view to counterbalancing the harrows 1 and imparting to the harrows 1 what may be properly designated a floating quality, this quality being particularly advantageous when young plants are being harrowed inasmuch as it lessens the weight of the harrows 1 and thereby practically does away with the liability of the young plants being damaged. Each spring 15 is connected at its rear end to the axle 8, as designated by 16, and each spring is connected at its forward end to a clamp 17, adjustably fixed on an adjacent arm 13 and adapted to be fitted in position in the direction of the length of said arm 13. Manifestly because of the adjustable capacity of the springs 15, the weight imposed on the ground by the harrows 1 may be readily and nicely changed to accommodate my improvement to different conditions.

Interposed between the end portions of the axle 8 and the corresponding portions of the drawbar 4 are braces 18 and 19, and connected to and extending rearwardly and upwardly from the central portion of the draw bar 4 is a bar 20 that carries a driver's seat 21, the said bar 20 being maintained in proper position above the axle 8 by an upright 22, connected to the bar 20 and also connected to the axle 8.

At 23 the bar 20 is equipped with a suitable foot rest, Figure 1.

Notwithstanding my improvement is possessed of the clearly practical advantages ascribed to it, it will be readily noted that the improvement is simple and inexpensive in construction, and light in weight, and at the same time is well adapted to withstand the usage to which apparatus of corresponding character is ordinarily subjected.

The construction herein disclosed constitutes the best practical embodiment of my invention of which I am cognizant. I do not desire, however, to be understood as restricting myself to the specific construction and relative arrangement of parts embraced in the said embodiment, my invention being defined by my appended claims within the scope of which changes in construction and relative arrangement may be made without departure from my invention.

Having described my invention, what I claim and desire to secure by Letters-Patent, is:—

1. A wheeled riding harrow comprising an axle equipped with ground wheels, independently movable harrows disposed below and spaced from said axle, a drawbar located in front of the axle and disposed in a plane considerably below that of the axle and connected with the harrows, braces interposed between the end portions of the axle and the end portions of the drawbar, a bar connected to the central portion of the drawbar and extending above the axle to a position in rear of the same and supported from the axle and equipped with a driver's seat, and rock shafts journaled on the axle at opposite sides of the center thereof and having rearwardly directed arms flexibly connected with the rear portions of the harrows and also having forwardly directed arms at opposite sides of and adjacent to the seat bar and provided with pedals.

2. A wheeled riding harrow comprising an axle equipped with ground wheels, independently movable harrows disposed below and spaced from said axle, a drawbar located in front of the axle and disposed in a plane considerably below that of the axle and connected with the harrows, braces interposed between the end portions of the axle and the end portions of the drawbar, a bar connected to the central portion of the drawbar and extending above the axle to a position in rear of the same and supported from the axle and equipped with a driver's seat, and rock shafts journaled on the axle at opposite sides of the center thereof and having rearwardly directed arms flexibly connected with the rear portions of the harrows and also having forwardly directed arms at opposite sides of and adjacent to the seat bar and provided with pedals, in combination with spring means for counterbalancing the harrows.

3. A wheeled riding harrow comprising an axle equipped with ground wheels, independently movable harrows disposed below and spaced from said axle, a drawbar located in front of the axle and disposed in a plane considerably below that of the axle and connected with the harrows, braces interposed between the end portions of the axle and the end portions of the drawbar, a bar connected to the central portion of the drawbar and extending above the axle to a position in rear of the same and supported from the axle and equipped with a driver's seat, and rock shafts journaled on the axle at opposite sides of the center thereof and having rearwardly directed arms flexibly connected with the rear portions of the harrows and also having forwardly directed arms at opposite sides of and adjacent to the seat bar and provided with pedals, in combination with retractile springs connected at their rear ends with the axle and having their forward ends connected to the pedal carrying arms and adjustable in length of the said arms for regulation of the balancing of the harrows.

4. A riding attachment for harrows comprising an axle with ground wheels at its ends, a drawbar located in front of and below the axle and connected with the end portions thereof, seat carrying means connected at the central portions of the axle and drawbar, and rockable driver controlled members carried by the axle and movable independently of each other, and each having a rearwardly extending arm adapted to be flexibly connected with a harrow below it.

5. A riding attachment for harrows comprising an axle with ground wheels at its ends, a drawbar located in front of and below the axle and connected with the end portions thereof, seat carrying means connected at the central portions of the axle and drawbar, and rockable driver controlled members carried by the axle and movable independently of each other, and each having a rearwardly extending arm adapted to be flexibly connected with a harrow below it, in combination with means for tensioning said rockable members.

6. A riding attachment for harrows comprising an axle with ground wheels at its ends, a drawbar located in front of and below the axle and connected with the end portions thereof, seat carrying means connected at the central portions of the axle and drawbar, and rockable driver controlled members carried by the axle and movable independently of each other, and each having a rearwardly extending arm adapted to be flexibly connected with a harrow below it; the said rockable members having pedal arms, in combination with retractile springs interposed between and connected to said pedal arms and the axle.

In testimony whereof I affix my signature.

WILLIAM E. BROWN.